Sept. 27, 1949.   F. O. SKIDMORE   2,483,388
CLOTHES PROP OR THE LIKE
Filed Feb. 10, 1948
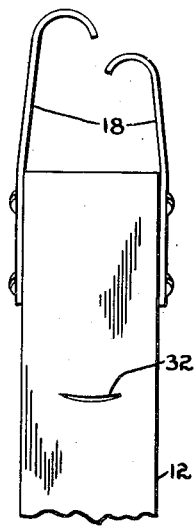
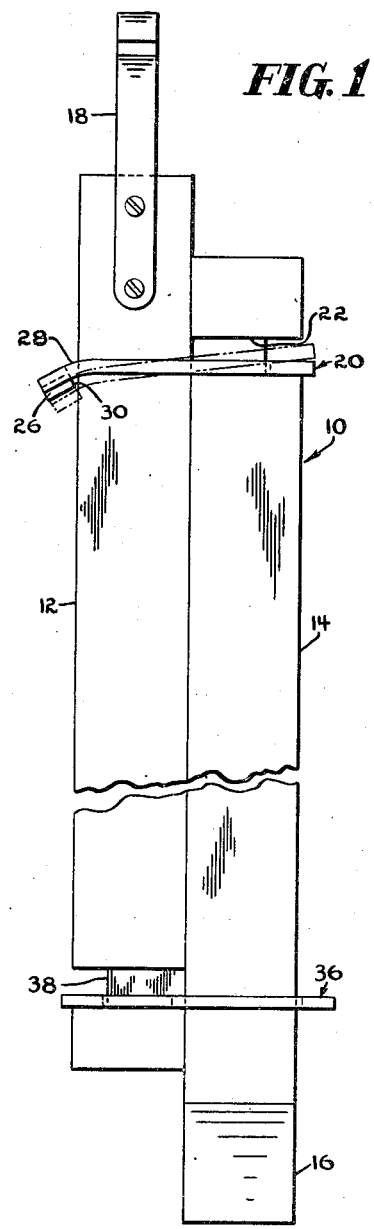
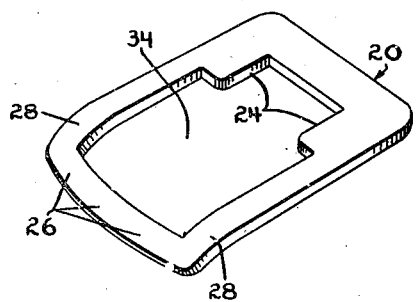
INVENTOR.
FRANK O. SKIDMORE
BY
Oldham & Oldham
Attorneys Patented Sept. 27, 1949

2,483,388

UNITED STATES PATENT OFFICE 2,483,388

CLOTHES PROP OR THE LIKE

Frank O. Skidmore, Cuyahoga Falls, Ohio, assignor of one-half to Herbert Reuss, Cuyahoga Falls, Ohio Application February 10, 1948, Serial No. 7,369

2 Claims. (Cl. 248—353)

1

This invention relates to telescoping clothes props, or the like, and, more particularly, is concerned with improved locking means for relatively slidable or telescoping members of the character described.

Heretofore, clothes props of the type illustrated in Patent No. 1,978,865 have been made and sold, but such props have been open to the objection that the locking means shown in the indicated patent do not provide a sufficiently positive grip between the relatively sliding parts of the prop, and with the result that the prop may suddenly collapse in use to drop clothes to the ground. This is obviously very objectionable. The lack of adequate locking action is particularly evident on props made from hard wood, and even when soft wood is used, the continued operation of the prop and the lock tends to form a glaze or polish on the wood in the area engaged by the lock so that positive locking action is not assured.

It has also been proposed to employ pointed teeth in association with a pivoted locking element, but such teeth dig into the members, which are usually wood, in an objectionable manner to roughen or crack the surface, and I have found, moreover, that unless the teeth are so sharp as to be objectionable as just noted, that an adequate lock is not provided by teeth which will also slide under certain load or heavy load conditions.

It is the general object of my invention to avoid and overcome the foregoing and other difficulties of and objections to known telescoping clothes props or the like, by the provision of an apparatus of this type including improved locking means which are relatively simple and inexpensive to manufacture, but which will function over long periods of time to provide extremely positive and satisfactory locking means under a wide variety of load conditions, including heavy loads.

Another object of my invention is the provision of locking means in association with devices of the indicated type, such locking means presenting a flatly curved metal edge in wedging relation to an element to be locked, such a metal edge making substantially only a point contact initially with the element to concentrate locking forces, but upon the application of additional load forming a crescent moon-like detent of considerable width in the element to provide very positive locking engagement.

The foregoing objects of my invention, and other objects which will become apparent as the description proceeds, are achieved by the provision of a clothes prop including relatively slidable elements, a lock pivotally mounted on one element and adapted to move in wedging relation with the other element, said lock presenting an arcuate metal edge to the other element to form a crescent moon-shaped detent therein of a width equal to at least one-third of the width of the element.

For a better understanding of my invention, reference should be had to the accompanying drawing, wherein:

Fig. 1 is a side elevation, partly broken away, of a telescoping wooden clothes prop incorporating the locking means of my invention;

Fig. 2 is a fragmentary front elevation of one of the sticks or elements of the clothes prop indicating the moon-shaped detent formed therein by the locking means; and Fig. 3 is a perspective view of the improved locking means of my invention.

It will be understood that the principles of my invention may be employed in conjunction with any of a plurality of relatively slidable or telescoping members or elements. However, one best known application thereof is in conjunction with clothes props, and, accordingly, the invention has been so illustrated and will be so described.

In the drawing, the numeral 10 indicates generally a telescoping clothes prop including a pair of elongated, relatively movable elements 12 and 14, such elements normally comprising wooden sticks, each some four feet in length, three-quarters of an inch or slightly thicker, and one inch to an inch and a half wide. The stick or element 14 is usually formed with a pointed lower end 16, and the stick or element 12 is provided at its upper end with metal or other means 18 for receiving and holding a clothes line or the like.

A locking means is pivotally supported adjacent the upper end of the stick or element 14, such locking means being indicated as a whole by the numeral 20 and including a portion slidably receiving and surrounding the stick or element 12. The locking means 20, shown in perspective in Fig. 3, is pivotally secured to the upper end of the stick or element 14 in any suitable way. One particularly convenient and advantageous manner of achieving the pivotal support for the locking means 20 is to provide a groove 22 around three sides of the stick 14, namely, at the back and two sides of the stick, and to provide in the locking means 20 a notch 24 which will fit loosely into the groove 22. The height of the groove 22, as shown, is such that a pivotal support is provided for the locking means which will permit movement of the locking means from the full line to the dotted line position shown in Fig. 1.

An important feature of the invention is that the portion of the locking means 20 which slidably receives and surrounds the stick 12 is transversely curved downwardly in the portion marked 26 in Fig. 3, the greatest depth to the curve being in the center of the portion 26. Also, the locking means is curved downwardly at each side near the end, as at 28, so as to tilt the curved portion 26 thereby presenting a metal edge of relatively flat arcuate shape closely adjacent the surface of the stick of element 12. The result is a releasable locking or wedging action. For example, when the stick 12 is raised relative to the stick 14 the stick 12 will slide freely through the locking means 20. But when a load is placed on the upper end of the stick 12, as by a loaded clothes line positioned in the holding means 18, the arcuate edge 30 of the locking means will engage the face of the stick 12, the locking means will pivot in the manner heretofore described, and the edge 30 of the locking means will bite into the face of the stick 12 with a wedging, locking action to very positively hold the sticks 12 and 14 in the desired relation to each other.

It is to be noted that the edge 30 contacts the face of the stick 12 substantially with a point contact, because of the arcuate shape of the edge 30, but that the application of the load to the stick 12 will cause the edge 30 to press a thin, crescent moon-shaped recess, indicated by the numeral 32 in Fig. 2, into the face of the stick 12. The recess 32 will be deepest at its center and of gradually less depth out to its edges, and under ordinary load conditions, the width of the recess 32 will be at least one-third of the width of the face of the stick 12, and often closer to one-half the width of the space, thereby insuring relatively large load holding area. The described locking means has been found from many experiments and tests to be decidedly superior to any locking means known heretofore.

When it is necessary to release the locking means, the stick 12 is raised slightly with respect to the stick 14, the locking means 20 is held in the full line position whereupon the stick 12 can be slid downwardly with respect to the stick 14 to telescope the prop back to the position illustrated in Fig. 1.

The locking means 20 has the advantage that it is conveniently made as a metal stamping, usually from a good, stiff grade, relatively thick gauge of aluminum so that the problem of rusting is eliminated, the metal stamping taking the form of the endless O-shaped member illustrated in Fig. 3, the inside corners of the stamping being square in the manner shown. Assembling the locking means and the sticks is a relatively simple and quick proceeding, the locking means 20 being first slipped over the stick 14 which is extended through the large opening 34 in the locking means 20 until the locking means is opposite the groove 22, whereupon the locking means is moved laterally to engage the notch 24 of the locking means in the groove 22. Now the stick 12 may be slid through the opening 34 of the locking means to position the sticks and locking means in assembled relation. No nails, screws, or other fastening means which will tend to come out or split the wood are required.

The clothes prop illustrated in Fig. 1 also includes a guiding means indicated as a whole by the numeral 36, such guiding means being identical to the locking means 20 except that the guiding means 36 is not curved in the regions 26 and 28 as heretofore described. The guiding means 36 is received in a groove 38 formed in the lower end of the stick 12, and the portion of the guiding means 36 not received in the groove 38 surrounds and guides the lower end of the stick or element 14. The guiding means 36 is assembled with the sticks 12 and 14 in the same manner.

From the foregoing, it will be recognized that the various objects of my invention have been achieved by the provision of a clothes prop or the like having relatively telescoping or movable members, and by the provision of improved locking means for facilitating securing the relatively movable members in desired relation to each other. The locking and guiding means comprise simple metal stampings of like character, but with the locking means being bent in two different planes to present a flat arcuate metal edge in close association with a surface to be locked. The flat arcuate edge of the locking means presents a point type of pressure contact with the surface which insures high pressure concentration to effect the locking action between the locking means and the surface, but with the point type of pressure contact changing during the wedging, locking action to a line type of pressure contact to produce a crescent moon-shaped recess in the surface to be locked, the recess being greatest at its center and dwindling away to nothing at its edges, and with the recess being usually at least one-third the width of the surface of the stick or other element being locked.

While in accord with the patent statutes, one particular embodiment of my invention has been illustrated and described in detail, it is to be definitely understood that I am not to be limited thereto or thereby, but that the scope of my invention is defined in the appended claims.

I claim:

1. A clothes prop or the like including a pair of wooden sticks slidably mounted in side by side relation, a locking member pivotally mounted on one stick and slidably surrounding the other, said member being stamped and having a downwardly and transversely curved jaw portion tilted to present an arcuate metal edge to said other stick for locking the sticks together when a load is applied in a direction to move the member in a locking direction.

2. A clothes prop or the like including relatively slidable elements, a lock pivotally mounted on one element and adapted to move into wedging relation with the other element, said lock presenting an arcuate metal edge to the other element to form a crescent moon-shaped detent therein of a width equal to at least one-third of the width of the element.

FRANK O. SKIDMORE.

REFERENCES CITED

The following references are of record in the file of this patent:

UNITED STATES PATENTS

| Number | Name | Date |
| --- | --- | --- |
| 1,468,476 | Keffer | Sept. 18, 1923 |
| 1,696,848 | Kautz | Dec. 25, 1928 |
| 1,978,865 | Haines | Oct. 30, 1934 |